United States Patent

[11] 3,560,822

[72] Inventor Richard C. Loshbough
 Toledo, Ohio
[21] Appl. No. 757,929
[22] Filed Sept. 6, 1968
[45] Patented Feb. 2, 1971
[73] Assignee Reliance Electric Company
 Euclid, Ohio
 a corporation of Delaware

[54] MOTOR CONTROL HAVING A FEEDBACK STABLILIZED GENERATOR
 1 Claim, 2 Drawing Figs.
[52] U.S. Cl. .................................................. 318/146,
 318/156, 318/158
[51] Int. Cl. ...................................................... H02p 5/22
[50] Field of Search .......................................... 318/145,
 146, 156, 158

[56] References Cited
UNITED STATES PATENTS

| | | | |
|---|---|---|---|
| 2,791,733 | 5/1957 | Chausse .................... | 318/146 |
| 3,032,698 | 5/1962 | Long et al. ................ | 318/158 |
| 3,442,352 | 5/1969 | Krauer et al. ............. | 187/29 |
| 3,448,357 | 6/1969 | Dolphin ..................... | 318/154 |
| 3,458,791 | 7/1969 | Boice ........................ | 318/146 |

Primary Examiner—Oris L. Rader
Assistant Examiner—K. L. Crosson
Attorney—Wilson & Fraser ABSTRACT: A variable voltage motor control wherein the hoist motor armature is supplied from a dynamoelectric machine having its characteristics linearized by a closed negative feedback loop including a controlled supply for its shunt field. The effective constant gain of the generator enhances operation particularly in elevator hoist motor controls.

PATENTED FEB 2 1971 3,560,822

INVENTOR.
RICHARD C. LOSHBOUGH

BY
Wilson & Fraser
ATTORNEYS

MOTOR CONTROL HAVING A FEEDBACK STABILIZED GENERATOR

CROSS-REFERENCE TO RELATED APPLICATIONS

This control is an improvement upon the elevator hoist motor controls disclosed in U.S. Pat. No. 3,435,916 issued April 1, 1969 on application Ser. No. 373,136 by Robert E. Bell, Donivan L. Hall and Richard C. Loshbough filed June 4, 1964 and entitled "Elevator Motor Speed Control Including High Gain Forward Loop and Lag-Lead Compensation" and divisions thereof, and to such controls as disclosed in application Ser. No. 380,385 filed July 6, 1964, now U.S. Pat. No. 3,523,231 for "Elevator Control" in the name of Donivan L. Hall, Richard C. Loshbough and Gerald D. Robaszkiewicz.

SUMMARY OF THE INVENTION

This invention relates to improvements in elevator hoist motor control wherein velocity or position based feedback signals are combined with pattern signals to produce an error signal which is amplified, with suitable compensation, for controlling the shunt field of a generator supplying hoist motor armature current. More particularly, the invention relates to linearizing the generator shunt field characteristics by means of a closed negative feedback loop from the armature to the controlled supply to the generator shunt field.

The loads imposed on elevator hoist systems, the variations in ambient conditions for those systems, and the exacting requirements as to control of a car position have dictated the use of variable voltage hoist motor controls employing generators having special characteristics particularly as to their compounding, changes with temperature, and magnetic hysteresis. Thus an elevator hoist motor system must accommodate hauling, balanced and overhauling loads for operating upward and downward. Flat compounding of the generator and internal compensation have been achieved in both velocity and position based controls by employing closed negative feedback loops having high gain and suitable compensation whereby the tendency toward deviations from desired characteristics are largely swamped out. However, even with these expedients the approach of the generator to saturation caused variations in characteristics which dictated a generator which operated well down on its saturation curve and offered relatively linear characteristics. The present invention enables a conventional commercial generator of a capacity corresponding to the maximum power requirements of the drive to be utilized in an elevator hoist motor system by forcing the generator to appear to have a linear characteristic over its entire range.

In elevator systems of conventional form, the band width varies with the operating point on the generator saturation curve, hence if the unbalanced load is large, during acceleration or deceleration the response of the car to a change in command signal tends to lag that signal as an inverse function of band width. An objective in slowing an elevator car is to have a predetermined car speed for all operating conditions are certain points given distances from the landing at which the car is to be stopped. Variations in loading alter the point on the generator shunt field operating curve at which the system operates such that a slowdown of an ascending car fully loaded is aided by the loading so that the voltage at the shunt field is at or near zero and a high gain is available while the slowdown of an empty ascending car requires the generator to provide a retarding force so that a high voltage is present at the shunt field and a low gain is exhibited. This drop in gain, i.e. the "voltage in voltage out" slope may amount to a factor of two or three as the generator approaches saturation and the resultant decrease in band width will increase the lag in motor response to the changes in the pattern signal so the that the speed at leveling points varies during the approach to the floor and the car either spots (stops short of the landing), overshoots or at least varies in its motion to add unwanted jerk and acceleration components.

In the present invention an inner negative feedback loop is closed around the generator armature terminals and provided with sufficient gain to force the generator to have a linear characteristic. This has enabled superior control of the hoist motor system to be achieved with a generator having a capacity only sufficient to meet the power needs of the system and of a standard commercial variety requiring no special field windings or extra taps to the field for adjustment. In addition, the system of the invention lends itself to adjustment without the time consuming cut and try techniques previously required. As a result, an average saving per hoist motor installation of the order five hundred dollars has been realized by taking advantage of the generator linearization of this invention while improving the operating characteristics of the systems.

An object of this invention is to improve variable voltage elevator hoist motor controls.

Another object is to reduce nonlinearity in the generator shunt field of a variable voltage elevator hoist motor control to a point where it is negligible.

A third object is to enhance the operating characteristics of variable voltage elevator hoist motor controls.

A fourth object is to reduce the initial and maintenance expense of variable voltage elevator hoist motor controls. In accordance with the above objects one feature of this invention is the incorporation of an inner negative feedback loop around a dynamoelectric generator in a variable voltage elevator hoist motor control. A further feature is the provision of a negative feedback path having a gain of the order of 0.02 from the generator armature terminals to a summing point for the generator shunt field control and amplification means within the loop to provide a loop gain of the order of 10.

DESCRIPTION OF THE DRAWINGS

The above and additional objects and features will be more fully appreciated from the following detailed description when read with reference to the accompanying drawing in which.

DETAILED DESCRIPTION

Figure 2:
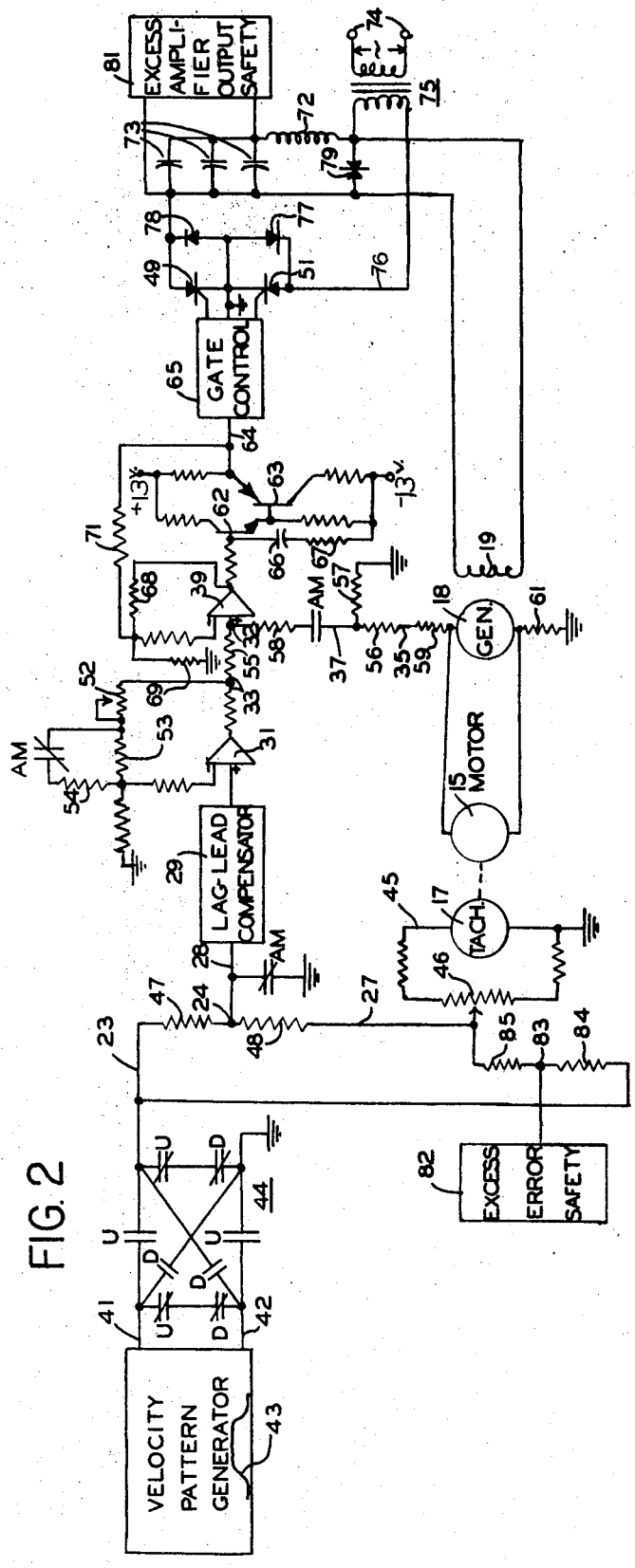
FIG. 2 is an expanded diagram partially in schematic and partially in block form illustrating in more detail the application of the invention to a commercial embodiment of the control of FIG. 1.

Elevator car 11 and its counterweight 12 have a traction drive from hoist cable sheave 13 through cable 14. Hoist motor 15 drives sheave 13 through shaft 16 to which is also coupled tachometer 17. Control of the motor 15 is by control of the generator 18 supplying its armature with a variable voltage dependent upon the power supplied to the shunt field winding 19 for the generator. Motor 15 has a separately excited shunt field (not shown) having a constant excitation level while the car is set to run. Generator shunt field 19 is supplied, for example, by controlled rectifiers having phase control firing circuits as shown in the above mentioned Bell et al. Pat. application, as represented by controlled source 21.

Control of the controlled source 21 is by means of an amplified and compensated error signal derived from the deviation of actual motor speed from commanded motor speed. A velocity servoloop having negative feedback reduces the error to a small value by employing high gain with compensation appropriate for an elevator system wherein the closed loop gain is reduced to a value less than unity at and above the natural resonant frequency of the resonant circuit comprising the total inductance and resistance in the hoist motor armature circuit and the capacitive effect of the total driven mass including the car, the counterweight and the driving means for the car, coupled into the armature circuit through the hoist motor. The total loop gain in the example is about 30 with lag-lead compensation having a lead break frequency in the range of 2.5 to 5 radians per second.

Figure 1:
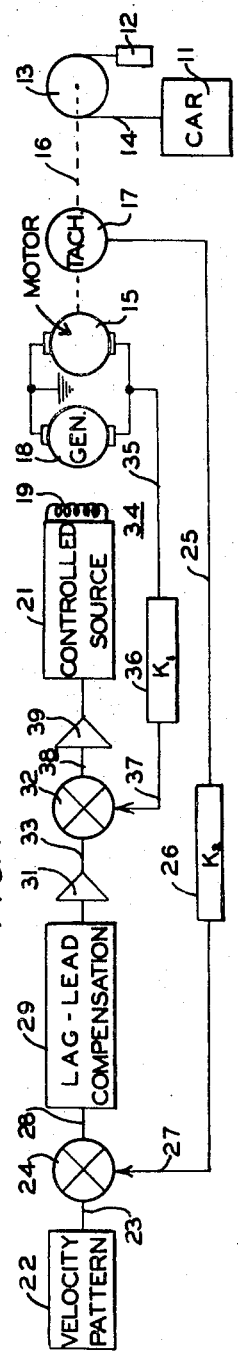
FIG. 1 is a block diagram of a velocity servo-type variable voltage elevator hoist motor control including the inner negative feedback loop of this invention.

A velocity servo control is shown in FIG. 1. A commanded velocity pattern generator 22 is arranged to develop a signal for a full speed run having a gradually increasing value from zero speed to maximum acceleration, a constant acceleration, a gradual transition from a maximum acceleration to zero acceleration at a maximum velocity, where full speed run is to be made, and a deceleration pattern which approaches a mirror image of the acceleration. The signal for a short run, when full speed is not achieved, includes the gradual acceleration to maximum acceleration and initiates a breakover for gradually reduced acceleration followed by gradually increased deceleration to maximum deceleration until zero velocity is approached when a gradual decrease to zero acceleration is made at zero velocity. These velocity pattern signals represented as voltage as a function of time are applied from output 23 of the pattern generator to summing point 24. Tachometer 17 develops a voltage proportional to actual hoist motor speed and a network 26 having a feedback constant $K_2$, which advantageously is set to provide 3 volts/100 ft./minute of rated maximum car speed to applies the speed signal to lead 27 and summing point 24.

An error signal, the algebraic sum of the commanded speed pattern and fed back tachometer signal which is a function of actual speed, issues on lead 28 from summing point 24 to the lag-lead compensator 29. Amplifier 31 amplifies the signal for application to summing point 32 through lead 33.

Linearization of the generator so that it appears as an ideal generator is accomplished by an inner negative feedback loop 34 around the generator. This loop includes a lead 35 from the generator armature terminals to the network 36. From network 36, lead 37 extends to summing point 32. The net signal resulting from the algebraic sum of signals at leads 37 and 33 if fed on lead 38 to amplifier 39 and thence to controlled source 21 for the generator shunt field 19. An inner loop gain of about 10 has been found to be satisfactory in that it is sufficient to accommodate excursions over a substantial portion of the operating characteristic, as where the gain is reduced by three from one extreme to the other, and yet the inner loop is not so underdamped as to require compensation. With a loop gain of 10 the inner loop as has the characteristic of a slightly underdamped quadratic.

The network in the feedback path of the inner loop is chosen to have a gain of 0.02 and the summing circuit has a gain of 0.5 so that with a gain of approximately 16 in the amplifier 39, a gain in the controlled supply of approximately 15 and a generator voltage gain (field to armature) of approximately four the inner loop gain is about 10.

The techniques combining the elements of FIG. 1 are disclosed in greater detail in FIG. 2 for a commercial embodiment of an elevator hoist motor control. The pattern generator produces a voltage proportional to velocity which is positive at lead 41 relative to lead 42 in the form typified at 43. An ascending car has pattern input 23 positive and a descending car has it negative by the switching matrix 44. Up relay U and down relay D (not shown) control the polarity of the pattern at 23 in response to signals corresponding to the conventional directionalized generator field relays such that when car motion is to be initiated upward and during such motion, relay U is energized and for down travel relay D is energized under the same conditions. When the car is stopped, relays U and D are dropped out to close their back contacts in matrix 44 thereby shorting the output leads 41 and 42 for the pattern and grounding lead 23. For up travel, relay U is energized to couple through its front contacts U lead 41 to the summing point 24 and to couple lead 42 to ground while the back contacts U open the short of 41 and 42 and the ground to 23. For down travel, front contacts D couple pattern output lead 42 to 23 and output lead 41 to ground while the back contacts D open the short of 41 and 42 and the ground to 23.

Tachometer 17 develops a negative signal at 45 for up travel of car 11 and a positive signal for down travel. These signals are proportioned to actual car speed at the desired level by adjustment of potentiometer 46. In one embodiment potentiometer 46 is adjusted to provide 3 volts at lead 27 for each 100 feet per minute of car speed for a tachometer which generates a voltage in the range of 6 to 12 volts per 100 feet per minute of car speed.

Velocity commanded by the pattern and actual velocity are compared or summed differentially at 24 by application of the voltage on leads 23 and 27 through resistors 47 and 48 of equal magnitude. The net voltage representing the velocity error or the amount by which the actual velocity differs from the commanded velocity is compensated and amplified for control of the firing of the silicon controlled rectifiers 49 and 51 by lag-lead compensator 29 and operational amplifier 31. This compensator and amplifier can be of the type generally shown in the above noted Bell et al. application. A single lag-lead network made up of resistor and capacitors (not shown) and having a lead break frequency of from 2.5 to 5 radians per second has been found satisfactory for the elevator systems to which the invention has been applied.

The gain employed in the operational amplifier 31 is established by the parameters of the system. For a typical system it is of the order of the closed loop gain, i.e. 30, and is established by the setting of rheostat 52. An increase in resistance increases the gain and causes the system to reduce its error. The gain setting is chosen based upon the practical limits for a comfortable elevator ride with satisfactory stability in the system for the parameters and constraints employed. Reducing the gain by decreasing the rheostat setting slows the response.

A running relay, AM, not shown is picked up when the elevator is ready to run and dropped out after the car has been stopped. While the car is stopped at a landing back contacts of relay AM close to ground lead 28 thereby forcing the apparent error signal to the compensator 29 to zero. At this time the gain of amplifier 31 is reduced by the shunting of resistor 53 with resistor 54 through closed back contact AM.

With the car stopped and the feedback signal removed due to the closed AM back contact grounding lead 28, small zero offsets in the amplifiers can become significant since there is no correction signal available. Such small signals are not significant to indicate faulty operation. The reduction in the gain of amplifier 31 by the shunting of resistor 53 maintains the sin signals resulting from such zero offsets at levels ineffective to affect the monitoring circuits of the system and thereby avoid false indications of unsafe operating conditions.

The velocity amplifier output signal is applied to summing point 32 through resistor 55 as a voltage of the same polarity as applied from the pattern signal switching matrix of lead 23. This signal is proportional to desired voltage on the generator armature 18. Armature voltage for the generator is attenuated at resistor 56 and grounded resistor 57 and applied through front contact AM and resistor 58 to summing point 32. Resistors 59 and 61 prevent application of full armature current to the control circuitry, thereby affording short circuit protection, and resistors 56 and 57 are chosen to scale armature voltage down by a factor of 50 to 1, effectively negating the effect of resistors 56 and 57 because of the relative values of resistance. The voltage at lead 37 is of opposite polarity to that at lead 33 so that it is negative for up and positive for down direction. The closed inner loop wipes out effects of generator iron saturation and IR drop through comparison of the actual generator armature voltage and the desired generator armature voltage and the amplification of the error signal tending to force that signal to a negligible value in an amount which is a function of the loop amplification.

During the interval the car is set to run, front contact A, AM is closed to close the inner loop 34, however when the car is stopped and the suicide connection of the fields is made it is desirable to open this loop to avoid any feedback. Thus contact AM opens while the suicide connection (not shown) is maintained.

Operational amplifier 39 amplifies the inner loop voltage to force the error toward zero and at lead 64 imposes the resultant signal on a phase control firing circuit 65 for the gates of SCR's 49 and 51 The net output of operational amplifier 39 and its emitter followers 62 and 63 as it appears at 64 is limited in its rate of change through the operation of the phase shaft network comprising capacitance 66 and resistor 67 to avoid excessive circulating currents should an abrupt change in signal be experienced. Transistors 62 and 63 offer unity gain and the gain of operational amplifier 39 is determined by the relationship of the value of resistance 68 to that of resistance 69. Minor changes on the output 64 are not influenced by the capacitance 66 and resistance 67. Abrupt changes of signal pass through the RC filter 66 and 67 and therefore are not reflected at output 64.

The effect of resistance 67 and capacitance 66 on the phase shift in the system is negligible in view of the high gain around the loop of amplifier 39 and its emitter followers 62 and 63 as determined by resistor 71. This gain moves the break point of the network well beyond the frequency range of interest in elevator applications, hence any tendency to introduce a lag in the system is of no effect on its operation. The limited rate of change of gate control 65 prevents a reversal of the net current in intervals of less than one cycle duration, thereby protecting the choke 72 and the capacitance 73 connected across the SCR's 49 and 51 and across the highly inductive generator shunt field 19.

Alternating current is supplied to the SCR anode cathode circuits at terminals 74 to which the primary of transformer 75 is connected. The secondary of transformer 75 is coupled through lead 76 to the anode of SCR 51 and the cathode of a diode 77 shunting SCR 51, and through choke 72 and the capacitance 73 to the anode of SCR 49 and the cathode of its shunting diode 78. As the gate control applies a gating potential to the control electrodes of SCR, it fires to pass the remainder of the half cycle of alternating current. A steady state level of DC is thus developed across the capacitance 73 and choke 72 and is applied across generator shunt field 19 to control the generator. The impedance of capacitance 73 and choke 72 to 60 cycle alternating current is low, of the order of 2 ohms, so that any abrupt change in the gating pattern of the SCR's which would result in a shift from firing SCR 49 over a substantial portion of the half cycle it is forward biased, to firing SCR 51 over a substantial portion of the half cycle it is forward biased in effect reverses the current in the low impedance shunt with potentially destructive effect.

Back to back rectifier 79 can be a G.E. Thyrestor diode providing surge protection. In accordance with the aforenoted Bell et al. application, the hoist motor control system can be provided with safety means to either shut down the system or operate it at safe speeds when the output to the generator shunt field exceeds safe levels or when the velocity error signal is excessive as indicated by the EXCESS AMPLIFIER OUTPUT SAFETY or EAO circuit 81 and the EXCESS ERROR SAFETY or EE circuit 82. As implied by the names, the EAO circuit 81 is set to respond to a signal to the shunt field as viewed across capacitance 73 which exceeds a safe operating speed by responding to the threshold of such a signal level by shutting down the hoist motor operation through the opening of the main switch for the hoist motor. A similar shutdown is instituted when the velocity error signal exceeds safe value established by a threshold signal level preset in EE safety at 82. This error is sensed at summing point 83 through summing resistors 84 and 85 connected in parallel with summing resistor 47 and 48 connected to the pattern generator and tachometer 17 respectively.

When any safety is operated it requires a manual reset, wherein the motor generator set (not shown) is stopped, before the system can operate again.

The above system disclosure is illustrative and not to be read in a limiting sense. Generator linearization can be used advantageously in a system employed a positional pattern and feedback without departing from the invention and other adjuncts can be incorporated in the system as contemplated.

I claim:
1. A motor control for a direct current motor comprising a motor armature, a direct current generator, a shunt field for said generator, an armature for said generator, means operative coupling said generator armature to said motor armature, means to generate a voltage which is a function of actual motor speed, means to generate a voltage which is a function of commanded motor speed, means differentially summing said commanded and actual motor speed voltages to develop a motor speed error signal, means generating a commanded generator armature voltage in response to said motor speed error signal, means sensing actual generator-armature voltage, means differentially summing said commanded and actual generator-armature voltages to develop a generator-armature error voltage, an amplifier between said motor speed signal summing means and said generator-armature voltage signal summing means, a controllable source of electrical energy connected to supply said generator shunt field, means controlling said controllable source in response to said error voltage, and means to reduce the gain of said amplifier while said motor is stopped and to increase the gain of said amplifier while said motor is set to run, whereby zero offset of said amplifier is minimized when said motor is stopped.